(12) United States Patent
Phadatare et al.

(10) Patent No.: US 9,421,821 B2
(45) Date of Patent: Aug. 23, 2016

(54) VEHICLE RIMS INCLUDING DEFORMABLE FEATURES AND VEHICLES INCORPORATING THE SAME

(71) Applicant: Toyota Motor Engineering & Manufacturing North America, Inc., Erlanger, KY (US)

(72) Inventors: Avinash S. Phadatare, Canton, MI (US); Palani Palaniappan, Ann Arbor, MI (US); Jesse Taylor, Taylor, MI (US); James E. Ralph, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 2 days.

(21) Appl. No.: 14/510,217

(22) Filed: Oct. 9, 2014

(65) Prior Publication Data

US 2016/0101649 A1    Apr. 14, 2016

(51) Int. Cl.
 B60B 21/02    (2006.01)

(52) U.S. Cl.
 CPC ............. B60B 21/026 (2013.01); B60B 21/02 (2013.01); *B60B 2900/212* (2013.01); *B60Y 2200/11* (2013.01)

(58) Field of Classification Search
 CPC ... B60B 21/02; B60B 21/026; B60B 21/028; B60B 21/04; B60B 3/02; B60B 3/10; B60B 2900/212; B60Y 2200/11
 USPC .......................... 301/64.102, 95.107, 95.108
 See application file for complete search history.

(56) References Cited

U.S. PATENT DOCUMENTS

| 2,445,330 | A |  | 7/1948 | Lyon |  |
|---|---|---|---|---|---|
| 5,494,335 | A |  | 2/1996 | Kruger |  |
| RE35,497 | E |  | 4/1997 | Carter, III |  |
| 6,138,730 | A | * | 10/2000 | Fotij | B21D 53/30 152/398 |
| 6,312,059 | B1 | * | 11/2001 | Stach | B23K 15/0053 301/63.104 |
| 7,111,910 | B2 |  | 9/2006 | Abe et al. |  |
| 7,562,939 | B2 |  | 7/2009 | Zanin |  |
| 7,926,885 | B2 |  | 4/2011 | Saillet et al. |  |
| 8,046,900 | B2 | * | 11/2011 | Afeltra | B21D 53/26 29/527.5 |
| 8,544,589 | B1 |  | 10/2013 | Rupp et al. |  |
| 8,678,519 | B2 |  | 3/2014 | Yamamoto et al. |  |
| 2003/0209937 | A1 | * | 11/2003 | Tanaka | B60B 3/005 301/63.101 |
| 2005/0280309 | A1 | * | 12/2005 | Tanno | B60B 3/02 301/95.109 |
| 2005/0285440 | A1 | * | 12/2005 | Bal | B60B 21/023 301/63.101 |
| 2006/0091720 | A1 | * | 5/2006 | Francischetti | B60B 3/005 301/65 |

(Continued)

*Primary Examiner* — Darlene P. Condra
(74) *Attorney, Agent, or Firm* — Dinsmore & Shohl LLP

(57) ABSTRACT

Vehicle structures for dissipating and distributing energy associated with a collision are described herein. In one embodiment, a rim includes an inner flange and an outer flange that extend around a periphery of the rim, a rim wall that extends around the periphery of the rim and that extends between the inner flange and the outer flange in the vehicle lateral direction, a drop-well portion that is positioned between the rim wall and the outer flange in the vehicle lateral direction, where the rim wall comprises an increased thickness region that is positioned proximate to the drop-well portion, and where a maximum thickness of the increased thickness region is greater than a maximum thickness of the rim wall positioned outside of the increased thickness region, and at least one spoke extending radially inward from the drop-well portion.

14 Claims, 4 Drawing Sheets

(56) References Cited

U.S. PATENT DOCUMENTS

| | | | |
|---|---|---|---|
| 2006/0118226 A1* | 6/2006 | Christenbury | B60B 21/023 152/520 |
| 2007/0245562 A1* | 10/2007 | Malevergne | B60B 21/023 29/894.31 |
| 2008/0190534 A1* | 8/2008 | Malevergne | B60B 1/06 152/379.3 |
| 2013/0038117 A1 | 2/2013 | Miyamoto | |
| 2013/0239411 A1* | 9/2013 | Furukawa | B21D 53/30 29/894.35 |
| 2013/0257028 A1* | 10/2013 | Kuwabara | B62D 21/155 280/784 |
| 2014/0375112 A1* | 12/2014 | Werner | B60B 5/02 301/63.109 |

* cited by examiner

VEHICLE RIMS INCLUDING DEFORMABLE FEATURES AND VEHICLES INCORPORATING THE SAME

TECHNICAL FIELD

The present specification generally relates to vehicle rims that include deformable features, more specifically, to vehicle rims that include a rim wall having different rim wall thicknesses at preselected locations.

BACKGROUND

Vehicles may be equipped with bumper systems and crash protection structures that elastically and plastically deform to absorb energy in the event of a collision. In a front-end collision, for example, some of the energy associated with the collision may be directed into the wheel and the rim.

As one example, a substantial portion of energy from a small front bumper overlap impact may be directed outboard of many of the energy absorbing structures of the vehicle. Because a substantial portion of the energy from the impact is directed outboard of many of the energy absorbing structures of the vehicle, the energy from the impact may not be absorbed or may only be partially absorbed by those energy absorbing structures of the vehicle. The unabsorbed energy may be directed into a front wheel and then transferred rearward along the vehicle.

Accordingly, a need exists for alternative structures for transferring energy and absorbing energy from a small front bumper overlap collision.

SUMMARY

In one embodiment, a rim includes an inner flange that extends around a periphery of the rim, an outer flange that extends around the periphery of the rim and that is positioned outboard from the inner flange in a vehicle lateral direction, a rim wall that extends around the periphery of the rim and that extends between the inner flange and the outer flange in the vehicle lateral direction, a drop-well portion that is positioned between the rim wall and the outer flange in the vehicle lateral direction, where the rim wall includes an increased thickness region that is positioned proximate to the drop-well portion, and where a maximum thickness of the increased thickness region is greater than a maximum thickness of the rim wall positioned outside of the increased thickness region, and at least one spoke extending radially inward from the drop-well portion.

In another embodiment, a wheel includes a tire positioned radially around a rim, the rim including an inner flange that extends around a periphery of the rim, an outer flange that extends around the periphery of the rim and that is positioned outboard from the inner flange in a vehicle lateral direction, a rim wall that extends around the periphery of the rim and that extends between the inner flange and the outer flange in the vehicle lateral direction, a drop-well portion that is positioned between the rim wall and the outer flange in the vehicle lateral direction, where the rim wall includes an increased thickness region that is positioned proximate to the drop-well portion, and where a maximum thickness of the increased thickness region is greater than a maximum thickness of the rim wall positioned outside of the increased thickness region, and at least one spoke extending radially inward from the drop-well portion.

In yet another embodiment, a vehicle includes a unibody a suspension unit coupled to the unibody, the suspension unit including a wheel, the wheel including a tire positioned radially around a rim, the rim including an inner flange that extends around a periphery of the rim, an outer flange that extends around the periphery of the rim and that is positioned outboard from the inner flange in a vehicle lateral direction, a rim wall that extends around the periphery of the rim and that extends between the inner flange and the outer flange in the vehicle lateral direction, a drop-well portion that is positioned between the rim wall and the outer flange in the vehicle lateral direction, where the rim wall includes an increased thickness region that is positioned proximate to the drop-well portion, and where a maximum thickness of the increased thickness region is greater than a maximum thickness of the rim wall positioned outside of the increased thickness region, and at least one spoke extending radially inward from the drop-well portion.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicle rims according to the present disclosure include an inner flange and an outer flange that extend around a periphery of the rim, where the outer flange is positioned outboard from the inner flange in a vehicle lateral direction. The rims include a rim wall that extends around the periphery of the rim and that extends between the inner flange and the outer flange in the vehicle lateral direction. The rims further include a drop-well portion that is positioned between the rim wall and the outer flange. The rim wall includes an increased thickness region that is positioned proximate to the drop-well portion. A maximum thickness of the increased thickness region is greater than a maximum thickness of the rim wall positioned outside of the increased thickness region. These and other embodiments will be described in more detail below in reference to the appended drawings.

Figure 1:
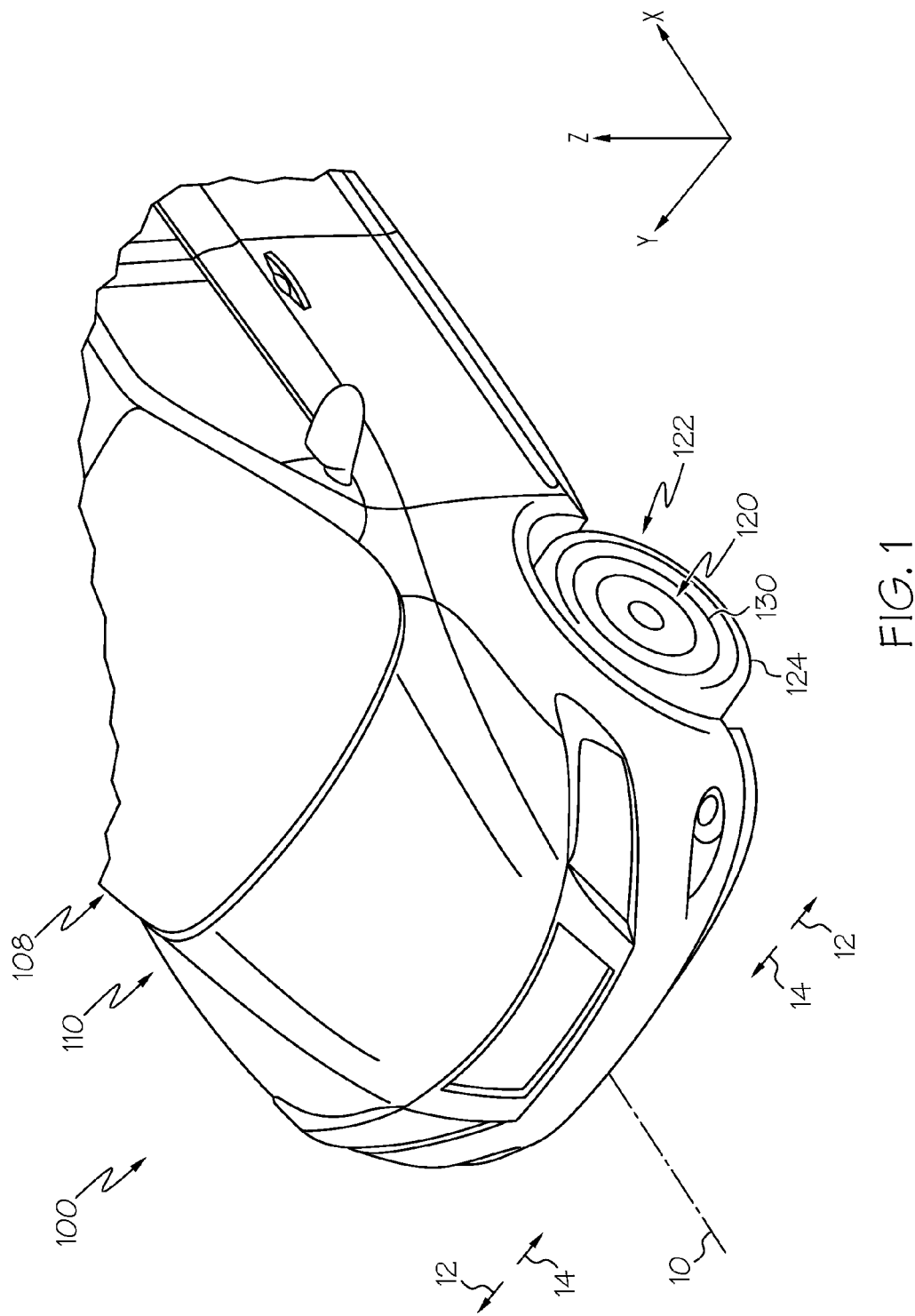
FIG. 1 schematically depicts a perspective view of a vehicle according to one or more embodiments shown or described herein.
Figure 2A:
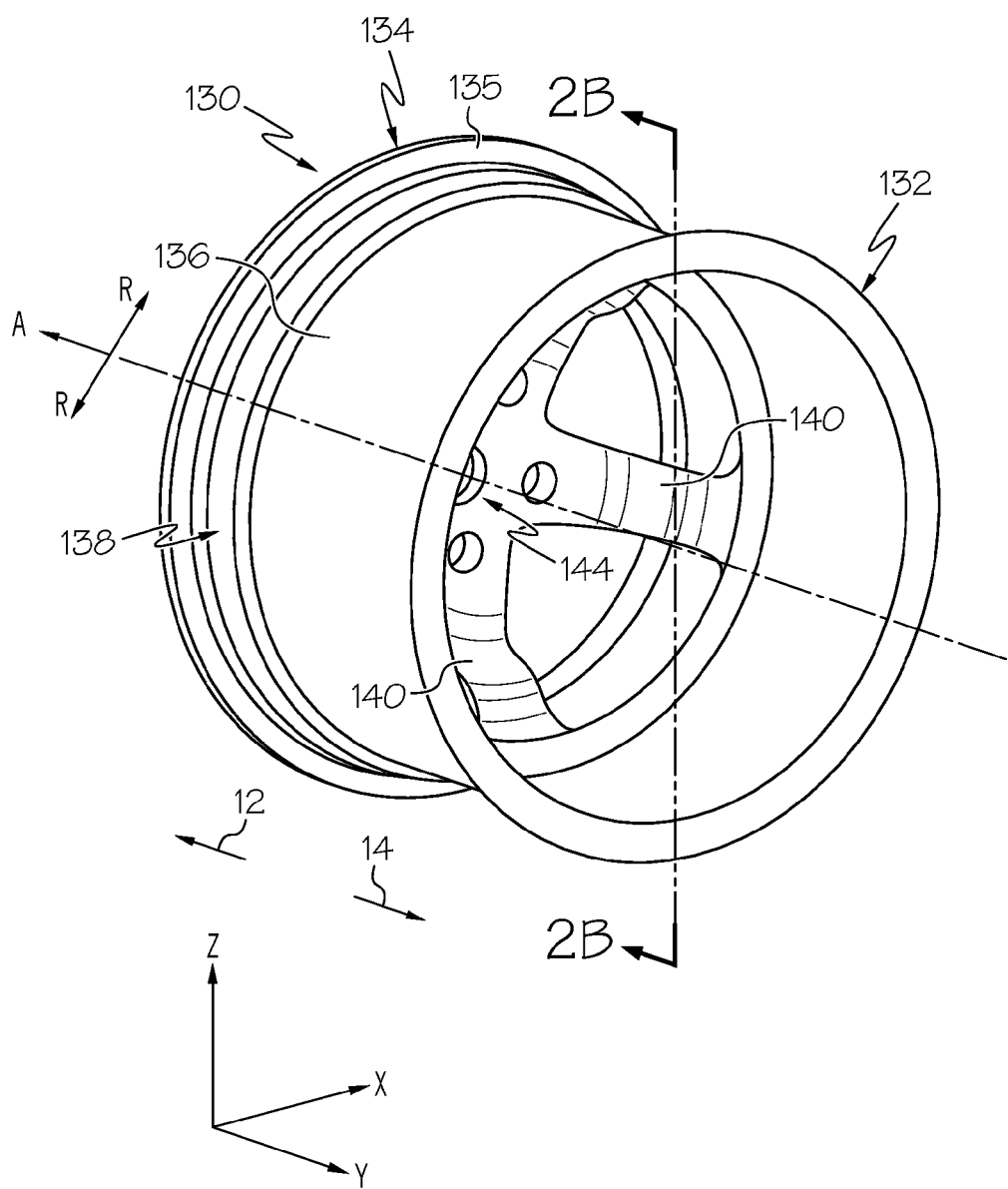
FIG. 2A schematically depicts a perspective view a rim according to one or more of the embodiments shown or described herein.
Figure 2B:
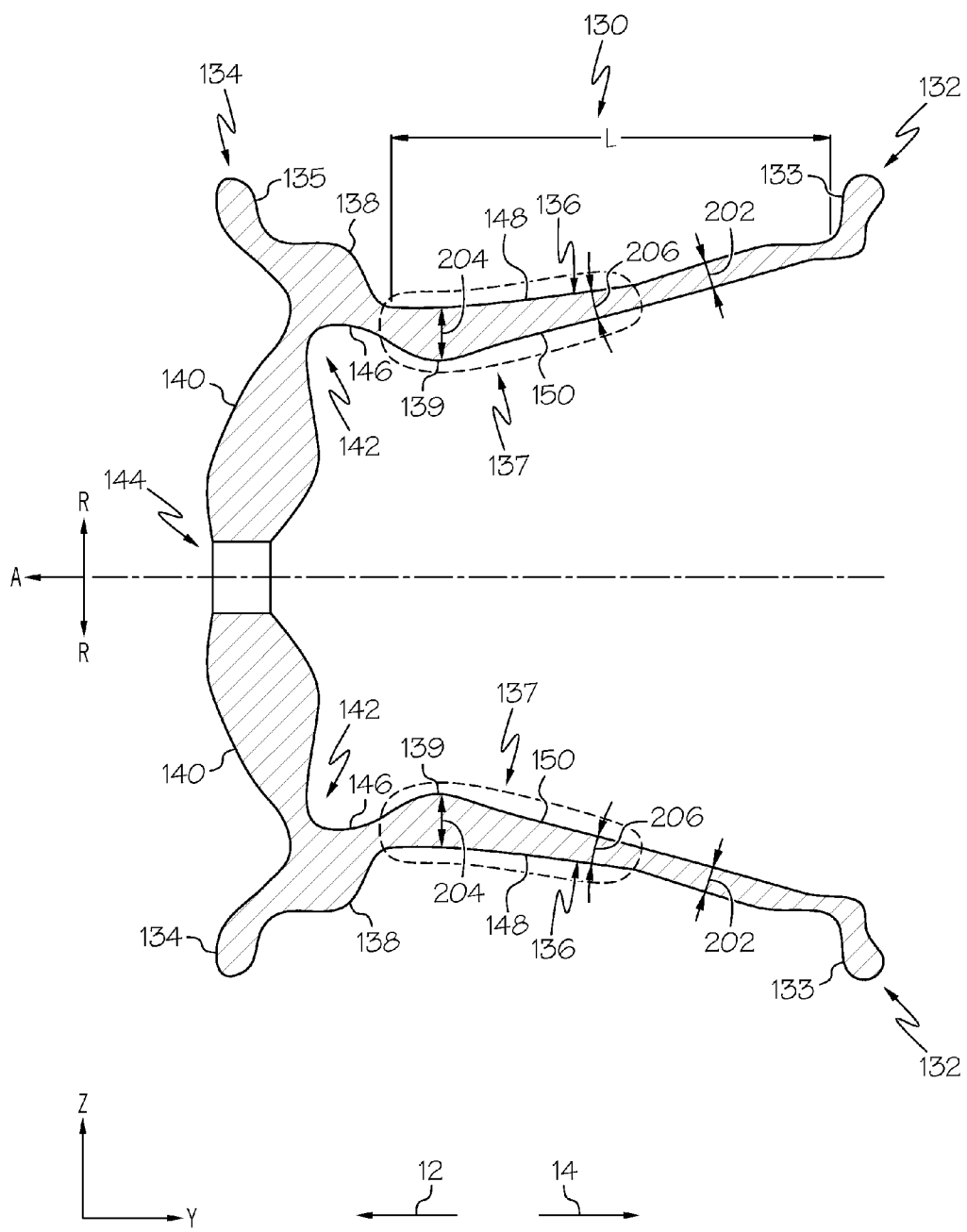
FIG. 2B schematically depicts a section view of a rim along section 2B-2B depicted in FIG. 2A according to one or more of the embodiments shown or described herein.

As used herein, the term "vehicle longitudinal direction" refers to the forward-rearward direction of the vehicle (i.e., in the +/−vehicle X-direction depicted in FIGS. 1-2B). The term "vehicle lateral direction" refers to the cross-vehicle direction (i.e., in the +/−vehicle Y-direction depicted in FIGS. 1-2B), and is transverse to the vehicle longitudinal direction. Further, the terms "inboard" and "outboard" are used to describe the relative positioning of various components of the vehicle. Referring to FIGS. 1-2B, the term "outboard" as used herein refers to the relative location of a component in direction 12 with respect to a vehicle centerline 10. The term "inboard" as used herein refers to the relative location of a component in direction 14 with respect to the vehicle centerline 10. Because the vehicle structures may be generally symmetrical about the vehicle centerline 10, the direction to which use of terms "inboard" and "outboard" refer may be mirrored about the vehicle centerline 10 when evaluating components positioned along opposite sides of the vehicle 100.

Motor vehicles that incorporate elements according to the present disclosure may include a variety of construction methodologies that are conventionally known, including the unibody construction methodology depicted in FIG. 1 as well as a body-on-frame construction methodology. While the embodiments of the present disclosure are described and depicted herein in reference to unibody structures, it should be understood that vehicles that are constructed with body-on-frame construction may incorporate the elements that are shown and described herein.

Referring initially to FIG. 1, a vehicle 100 is depicted. The vehicle 100 includes a unibody 110 onto which a vehicle drivetrain is coupled. The unibody 110 includes a pair of front suspension mounts and a pair of rear suspension mounts to which front suspension units 120 and rear suspension units of the vehicle 100 are generally attached. The vehicle 100 also includes a cabin 108 that is integral with the unibody 110. The cabin 108 generally defines a passenger cabin of the vehicle 100.

The vehicle 100 includes the pair of front suspension units 120 that are coupled to the unibody 110 of the vehicle 100. The front suspension units 120 may generally include vehicle components that connect the unibody 110 to a wheel 122. These components may include control arms, steering links, and a front chassis member including a spring and a strut. The spring and the strut may be coupled to a knuckle assembly including a hub. A wheel 122 may be coupled to the hub. The wheel 122 includes a tire 124 that surrounds a rim 130.

Referring to FIGS. 2A and 2B, the rim 130 is generally cylindrically shaped. The rim 130 includes an inner flange 132, an outer flange 134, a rim wall 136, a drop-well portion 138, and at least one spoke 140. In embodiments, the rim 130 may be formed from a variety of materials, including, but not limited to, cast aluminum, steel, structural alloys, or the like. The inner flange 132 of the rim 130 is positioned at and extends around a periphery of the rim 130. The inner flange 132 may include an outboard facing wall 133, to which a bead of the tire 124 may be seated and/or engaged during normal vehicle operation.

The outer flange 134 of the rim 130 is positioned at and extends around the periphery of the rim 130. The outer flange 134 is positioned outboard from the inner flange 132 in the vehicle lateral direction. The outer flange 134 may include an inboard facing wall 135, to which a bead of the tire 124 may be seated and/or engaged during normal vehicle operation. Through the engagement of the outboard facing wall 133 and the inboard facing wall 135 with the beads of the tire 124, the tire 124 may be coupled to the rim 130.

Referring particularly to FIG. 2B, the rim wall 136 extends between the inner flange 132 and the outer flange 134 in the vehicle lateral direction. The rim wall 136 extends around the periphery of the rim 130. The drop-well portion 138 is positioned between the rim wall 136 and the outer flange 134 in the vehicle lateral direction. The rim wall 136 may have a length L that extends between the inner flange 132 and the drop-well portion 138 in the vehicle lateral direction. The rim wall 136 may be generally sloped such that positions of the rim wall 136 proximate to the drop-well portion 138 are positioned radially inward (i.e., in the −R direction depicted in FIGS. 2A and 2B) from positions of the rim wall 136 that are positioned proximate to the inner flange 132.

The rim wall 136 includes an increased thickness region 137. The increased thickness region 137 is positioned proximate to the drop-well portion 138. As used herein, the term "proximate" with respect to the increased thickness region 137 and the drop-well portion 138 means that the increased thickness region 137 is positioned no further than 50% of the length L of the rim wall 136 away from the drop-well portion 138 in the vehicle lateral direction. In some embodiments, the increased thickness region 137 may extend across at least 10% of the length L of the rim wall 136 in the vehicle lateral direction. In other embodiments, the increased thickness region 137 may extend across at least 25% of the length L of the rim wall 136 in the vehicle lateral direction. In other embodiments, the increased thickness region 137 may extend across at least 40% of the length L of the rim wall 136 in the vehicle lateral direction. In still other embodiments, the increased thickness region 137 may extend across 50% of the length L of the rim wall 136 in the vehicle lateral direction. In embodiments, a minimum thickness of the increased thickness region 137 may be greater than a maximum thickness of the rim wall 136 positioned outside of the increased thickness region 137.

The increased thickness region 137 has a maximum thickness 204. The maximum thickness 204 of the increased thickness region 137 may be located at an apex 139. The increased thickness region 137 may have a generally graduated shape leading to the apex 139, such that the thickness of the increased thickness region 137 gradually increases approaching the apex 139. In some embodiments, the increased thickness region 137 of the rim wall 136 includes an outer surface 148 and an inner surface 150 that is positioned radially inward from the outer surface 148. At positions of increased thickness region 137 inboard from the apex 139, the outer surface 148 and the inner surface 150 may be generally planar and may be positioned at an angle 206 with respect to each other. In some embodiments, the angle 206 greater than about 0.5°. In other embodiments, the angle 206 may be greater than about 0.5° and less than about 1°. In still other embodiments, the angle 206 may be greater than about 0.5° and less than about 5°. In yet other embodiments, the angle 206 may be greater than about 0.5° and less than about 15°. By positioning the outer surface 148 and the inner surface 150 at a relatively small angle 206 with respect to one another, the increased thickness region 137 may have a generally graduated shape. By having a graduated shape, the increased thickness region 137 may reduce stress concentrations in the rim wall 136 at the increased thickness region 137.

The rim wall 136 has a maximum thickness 202 outside of the increased thickness region 137. In embodiments, the maximum thickness 204 of the rim wall 136 at the increased thickness region 137 is greater than the maximum thickness 202 of the rim wall 136 outside of the increased thickness region 137. In some embodiments, the maximum thickness 204 of the increased thickness region 137 may be at least 25% greater than the maximum thickness 202 of the rim wall 136 positioned outside of the increased thickness region 137. In other embodiments, the maximum thickness 204 of the increased thickness region 137 may be at least 35% greater than the maximum thickness 202 of the rim wall 136 positioned outside of the increased thickness region 137. In still other embodiments, the maximum thickness 204 of the increased thickness region 137 may be at least 50% greater than the maximum thickness 202 of the rim wall 136 positioned outside of the increased thickness region 137. Because the rim wall 136 has a greater thickness at the increased thickness region 137, the rim wall 136 may have a higher strength and/or stiffness evaluated in the radial direction at the increased thickness region 137 as compared to the strength and/or stiffness of the rim wall 136 outside of the increased thickness region 137. By increasing the strength and/or stiffness of the rim wall 136 at the increased thickness region 137, the rim 130 may selectively deform during a collision as will be described in greater detail herein.

At least one spoke 140 extends radially inward from the drop-well portion 138 of the rim 130. The at least one spoke 140 may extend between the drop-well portion 138 to a hub attachment portion 144 of the rim 130. The hub attachment portion 144 may be coupled to the hub of the front suspension unit 120 during normal vehicle operation. Accordingly, the hub attachment portion 144 may couple the rim 130 to the unibody 110 of the vehicle 100 through the front suspension unit 120.

The drop-well portion 138 of the rim 130 may include a stiffness-reducing portion 142 that is positioned between the rim wall 136 and the at least one spoke 140. The stiffness-reducing portion 142 may include a deformation initiator, such as a radially inward-facing concave portion 146. As shown in FIG. 2B, the radially inward-facing concave portion 146 faces a central axis A that extends through the rim 130. The radially inward-facing concave portion 146 of the drop-well portion 138 may reduce a section modulus of the drop-well portion 138 evaluated in the radial direction as compared to drop-well portion 138 that does not include a radially inward-facing concave portion 146. By reducing the section modulus of the drop-well portion 138, the drop-well portion 138 may have a reduced strength and/or stiffness as evaluated in the radial direction. By reducing the strength and/or stiffness of the drop-well portion 138, the drop-well portion 138 may selectively deform during a collision, as will be described in greater detail herein. While a radially inward-facing concave portion 146 is depicted, other deformation initiators may be used, for example and without limitation, square or v-shaped grooves and/or notches. Additionally, more than one deformation initiator may be utilized and/or multiple different deformation initiators may be utilized simultaneously, such as a series of notches and/or a series of notches positioned on the radially inward-facing concave portion 146.

When a vehicle is involved in a collision, vehicle structures may elastically and plastically deform to absorb energy while slowing the vehicle from its previous operating speed. The vehicle structures divert and absorb the energy associated with the moving vehicle into energy that deforms the vehicle structures. The vehicle structures may be designed to accommodate the introduction of the energy of the collision, such that the energy associated with the collision may be controllably dissipated and directed through selective and preferential deformation of the vehicle structures.

The front corner of the vehicle may strike an object in what is referred to herein as a small front bumper overlap or a small overlap collision. In a small front bumper overlap collision, the collision occurs at an outboard portion of the vehicle (evaluated in a vehicle lateral direction), and only a portion of the front bumper strikes the object. In some small front bumper overlap collisions, only about 25% of the front bumper strikes the object. In such collisions, some of the energy dissipation elements of the vehicle may not be initiated. In such collisions, the energy that is introduced to the vehicle structures may be non-symmetrical when evaluated in the vehicle lateral direction. Accordingly, the reaction of the vehicle structures to the energy introduced by the small front bumper overlap collisions may introduce a non-symmetrical response to the vehicle structures. Referring to embodiments disclosed herein, the structural members of the unibody 110 for example, may be non-symmetrically loaded when the vehicle is involved in a small front bumper overlap collision.

Referring to FIGS. 1-2B, when a vehicle strikes an object with a front corner of the vehicle, the structures of the vehicle plastically and elastically deform to absorb the energy of the impact. Because only a portion of the front bumper strikes an object during a small front bumper overlap collision, all of the energy absorbing structures associated with the front bumper may have a reduced effect on the dissipation of energy of the impact. In particular, some of the energy absorbing structures associated with the front bumper of the vehicle may not be activated or may be only partially activated, such that a portion of the energy absorbing structure of the vehicle may not dissipate energy associated with the small front bumper overlap collision. Instead, the energy from the impact may be directed into the front suspension unit 120 of the vehicle proximate to the barrier that the vehicle impacts.

Referring to FIG. 1, the energy of the small front bumper overlap collision is directed into the portion of the front bumper proximate to the barrier and to the front suspension unit 120 that is proximate to the barrier that the vehicle 100 impacts. The energy that is directed into the front suspension unit 120 may be directed into the wheel 122 through contact between the wheel 122 and the vehicle structures that are positioned forward of the wheel 122. The energy may elastically and plastically deform the wheel 122. The energy may also direct the wheel 122 in a generally rearward vehicle longitudinal direction. The wheel 122 may continue to be directed rearward until the wheel 122 impacts vehicle structures that are positioned rearward of the wheel 122, such as the cabin 108.

The energy associated with the collision may elastically and plastically deform the rim 130 of the wheel 122. In some impact configurations, a significant portion of the energy associated with the collision may be directed into an outboard end of the rim 130 proximate to the outer flange 134. Because a significant portion of the energy associated with the collision may be directed into the rim proximate to the outer flange 134, the outer flange 134 of the rim 130 may plastically and elastically deform, rotating radially inward with respect to the inner flange 132. The radially inward rotation of the outer flange 134 with respect to the inner flange 132 may impart stress on the rim wall 136 that extends between the inner flange 132 and the outer flange 134.

As discussed hereinabove, the rim 130 includes a rim wall 136 that has an increased thickness region 137. The maximum thickness 204 of the increased thickness region 137 is greater than the maximum thickness 202 of the rim wall 136 that is positioned outside of the increased thickness region 137. Further, as discussed hereinabove, the rim wall 136 may have a higher strength and/or stiffness in the radial direction at the increased thickness region 137 as compared the rim wall 136 at a position outside of the increased thickness region 137. By increasing the strength and/or stiffness of the rim wall 136 at the increased thickness region 137, the rim wall 136 may accommodate stresses that may be imparted to the rim wall 136 as a result of the radially inward rotation of the outer flange 134. Specifically, by increasing the strength and/or stiffness of the rim wall 136 proximate to the drop-well portion 138, the rim wall 136 may accommodate higher stresses prior to fracturing.

By allowing the rim wall 136 to accommodate higher stress prior to fracturing, the increased thickness region 137 of the rim wall 136 may allow the outer flange 134 of the rim 130 to translate further in the radially inward direction before fracture of the rim wall 136. By allowing the outer flange 134 to translate further radially inward, the rim 130 proximate to the outer flange 134 may further plastically and elastically deform, absorbing a greater amount of energy from the collision. By absorbing a greater amount of energy from the collision, the rim 130 may reduce the amount of energy that is associated with the collision that is directed rearward toward the cabin 108 of the vehicle 100.

Further, as described hereinabove, the drop-well portion 138 may include a stiffness-reducing portion 142 that is positioned between the at least one spoke 140 and the rim wall 136. The stiffness-reducing portion 142 may include a radially inward-facing concave portion 146. The stiffness-reducing portion 142 of the rim 130 may have a reduced strength and/or stiffness as evaluated in the radial direction as compared to a rim 130 that does not include a stiffness-reducing portion 142. By reducing the strength and/or stiffness as evaluated in the radial direction, the stiffness-reducing portion 142 may allow increased plastic and elastic deformation of the rim 130 as compared to a rim 130 that does not include a stiffness-reducing portion 142. By allowing plastic and elastic deformation of the rim 130, the stiffness-reducing portion 142 may increase the amount of energy that may be absorbed by the rim 130 during a collision. By increasing the amount of energy that may be absorbed by the rim 130 during a collision, the stiffness-reducing portion 142 may decrease the amount of energy associated with the collision that is directed rearward toward the cabin 108 of the vehicle 100.

Figure 3A:
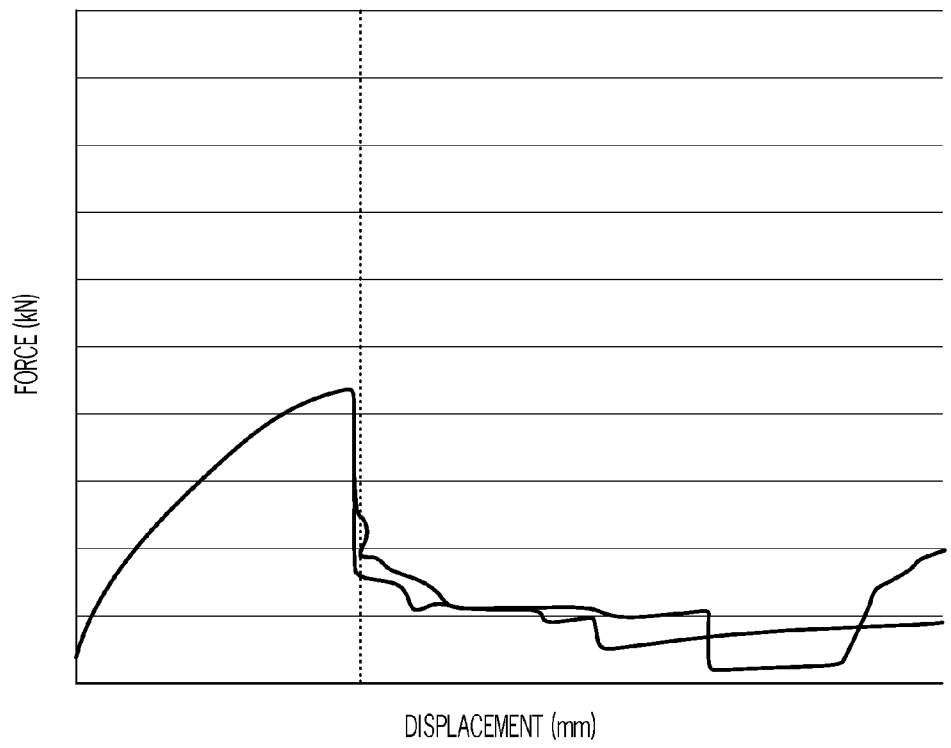
FIG. 3A depicts a graph plotting a reaction force that is exerted by a conventional rim as an outboard edge of the conventional rim is translated radially inward.

For example and referring to FIG. 3A, a graph showing a reaction force exerted by conventional rims as an outboard end of the rim is translated radially inward is depicted. In particular, FIG. 3A depicts the reaction force exerted by two different conventional rims as an outboard end of the rims is translated radially inward. As can be seen in FIG. 3A, the reaction force exerted by the rim is depicted on the y-axis in kilo-newtons (kN), and the radially inward displacement of the outboard end of the rim is depicted on the x-axis in millimeters (mm). As shown in FIG. 3A, a conventional rim provides an increased reaction force as the outboard end of the rim is translated radially inward. As the outboard end of the conventional rim approaches 30 mm of radially inward displacement, the rim wall fractures, and the conventional rim ceases to provide an increasing reaction force as the outboard end of the rim is translated radially inward.

Figure 3B:
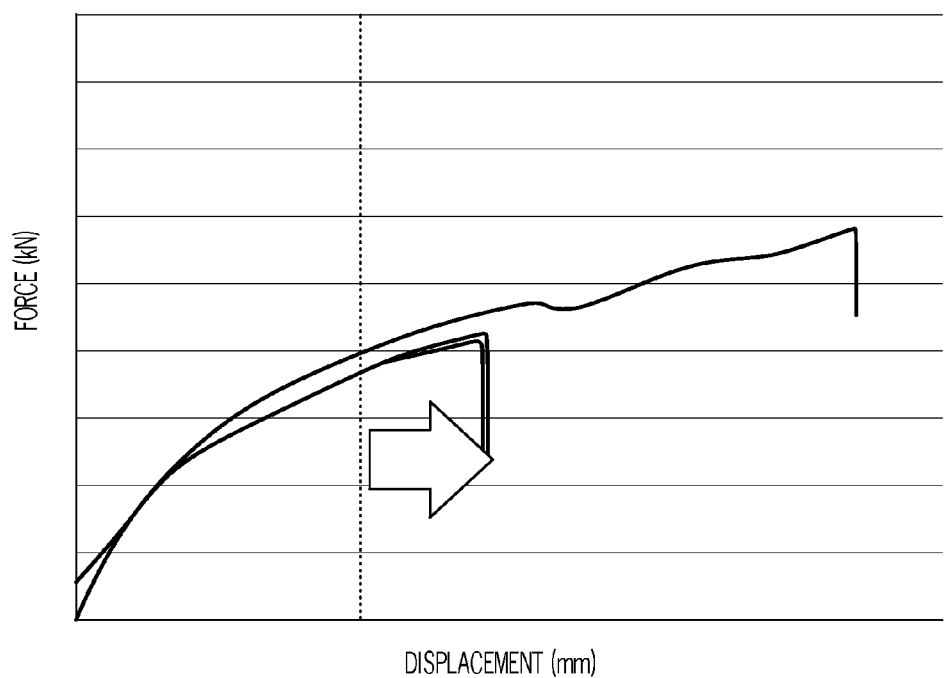
FIG. 3B depicts a graph plotting a reaction force that is exerted by a rim including an increased thickness region and/or a stiffness-reducing portion according to one or more embodiments shown or described herein as an outboard edge of the rim is translated radially inward.

In contrast, for example and referring to FIG. 3B, a graph showing a reaction force exerted by rims including an increased thickness region and/or a stiffness-reducing portion as an outboard end of the rim is translated radially inward is depicted. In particular, FIG. 3B depicts the reaction force exerted by three different rims including an increased thickness region and/or a stiffness-reducing portion as an outboard end of the rim is translated radially inward. As shown in FIG. 3B, rims including an increased thickness region and/or a stiffness reducing portion provide an increased reaction force as the outboard end of the rim is translated radially inward. In contrast to the conventional rim, the rims including an increased thickness region and/or a stiffness reducing portion may reach 40 mm or greater of radially inward displacement of the outboard end before the rim wall fractures. As described hereinabove, by allowing the outer flange to translate further radially inward, the rim proximate to the outer flange may further plastically and elastically deform, absorbing a greater amount of energy from the collision.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A rim comprising:
    an inner flange that extends around a periphery of the rim;
    an outer flange that extends around the periphery of the rim and that is positioned outboard from the inner flange in a vehicle lateral direction;
    a rim wall that extends around the periphery of the rim and that extends between the inner flange and the outer flange in the vehicle lateral direction;
    a drop-well portion that is positioned between the rim wall and the outer flange in the vehicle lateral direction, wherein the rim wall comprises an increased thickness region that is positioned proximate to the drop-well portion, and wherein a maximum thickness of the increased thickness region is greater than a maximum thickness of the rim wall positioned outside of the increased thickness region;
    a central axis extending through the rim;
    at least one spoke extending radially inward from the drop-well portion; and
    a stiffness-reducing portion comprising a radially inward-facing concave portion positioned between the rim wall and the at least one spoke, wherein the stiffness-reducing portion faces the central axis.

2. The rim of claim 1, wherein the maximum thickness of the increased thickness region is at least 25% greater than the maximum thickness of the rim wall positioned outside of the increased thickness region.

3. The rim of claim 1, wherein the maximum thickness of the increased thickness region is at least 50% greater than the maximum thickness of the rim wall positioned outside of the increased thickness region.

4. The rim of claim 1, wherein the increased thickness region extends across at least 10% of the rim wall in the vehicle lateral direction.

5. The rim of claim 1, wherein the maximum thickness of the increased thickness region is positioned at an apex of the increased thickness region, and wherein the increased thickness region comprises an outer surface and an inner surface that is positioned radially inward from the outer surface, wherein the outer surface and the inner surface are positioned at an angle with respect to each other at positions inboard of the apex, such that the increased thickness region has a generally graduated shape.

6. The rim of claim 5, wherein the angle between the outer surface and the inner surface is greater than about 0.5°.

7. A wheel comprising:
a tire positioned radially around a rim;
the rim comprising;
    an inner flange that extends around a periphery of the rim;
    an outer flange that extends around the periphery of the rim and that is positioned outboard from the inner flange in a vehicle lateral direction;
    a rim wall that extends around the periphery of the rim and that extends between the inner flange and the outer flange in the vehicle lateral direction;
    a drop-well portion that is positioned between the rim wall and the outer flange in the vehicle lateral direction, wherein the rim wall comprises an increased thickness region that is positioned proximate to the drop-well portion, and wherein a maximum thickness of the increased thickness region is greater than a maximum thickness of the rim wall positioned outside of the increased thickness region;
    a central axis extending through the rim;
    at least one spoke extending radially inward from the drop-well portion; and
    a stiffness-reducing portion comprising a radially inward-facing concave portion positioned between the rim wall and the at least one spoke, wherein the concave portion faces the central axis.

8. The wheel of claim 7, wherein the maximum thickness of the increased thickness region is at least 50% greater than the maximum thickness of the rim wall positioned outside of the increased thickness region.

9. A vehicle comprising:
a unibody;
a suspension unit coupled to the unibody, the suspension unit comprising a wheel, the wheel comprising:
    a tire positioned radially around a rim;
    the rim comprising;
        an inner flange that extends around a periphery of the rim;
        an outer flange that extends around the periphery of the rim and that is positioned outboard from the inner flange in a vehicle lateral direction;
        a rim wall that extends around the periphery of the rim and that extends between the inner flange and the outer flange in the vehicle lateral direction;
        a drop-well portion that is positioned between the rim wall and the outer flange in the vehicle lateral direction, wherein the rim wall comprises an increased thickness region that is positioned proximate to the drop-well portion, and wherein a maximum thickness of the increased thickness region is greater than a maximum thickness of the rim wall positioned outside of the increased thickness region;
        a central axis extending through the rim;
        at least one spoke extending radially inward from the drop-well portion; and
        a stiffness-reducing portion comprising a radially inward-facing concave portion positioned between the rim wall and the at least one spoke, wherein the concave portion faces the central axis.

10. The vehicle of claim 9, wherein the maximum thickness of the increased thickness region is at least 25% greater than the maximum thickness of the rim wall positioned outside of the increased thickness region.

11. The vehicle of claim 9, wherein the maximum thickness of the increased thickness region is at least 50% greater than the maximum thickness of the rim wall positioned outside of the increased thickness region.

12. The vehicle of claim 9, wherein the increased thickness region extends across at least 10% of the rim wall in the vehicle lateral direction.

13. The vehicle of claim 9, wherein the maximum thickness of the increased thickness region is positioned at an apex of the increased thickness region, and wherein the increased thickness region comprises an outer surface and an inner surface that is positioned radially inward from the outer surface, wherein the outer surface and the inner surface are positioned at an angle with respect to each other at positions inboard of the apex, such that the increased thickness region has a generally graduated shape.

14. The vehicle of claim 13, wherein the angle between the outer surface and the inner surface is greater than about 0.5°.

* * * * *